(12) United States Patent
Kasai et al.

(10) Patent No.: US 6,335,600 B1
(45) Date of Patent: Jan. 1, 2002

(54) MOTOR DRIVE UNIT AND METHOD OF DETECTING MALFUNCTION OF MOTOR DRIVE UNIT

(75) Inventors: Eiji Kasai, Toyota; Shuji Fujita, Anjo, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/655,916

(22) Filed: Sep. 6, 2000

(30) Foreign Application Priority Data

Sep. 7, 1999 (JP) .......................................... 11-252593

(51) Int. Cl.$^7$ ............................................... H02P 1/22
(52) U.S. Cl. ........................ 318/434; 318/811; 388/903
(58) Field of Search .................................. 318/254, 139, 318/798–805, 812, 434, 811; 388/903

(56) References Cited

U.S. PATENT DOCUMENTS

| | | | | |
|---|---|---|---|---|
| 4,924,158 A | * | 5/1990 | Kelley et al. ................ | 318/434 |
| 5,369,349 A | * | 11/1994 | Tsuchiya et al. ............. | 318/811 |
| 5,969,919 A | * | 10/1999 | Kobayashi et al. .......... | 318/254 |

FOREIGN PATENT DOCUMENTS

JP          05185937          7/1993

* cited by examiner

Primary Examiner—Khanh Dang
(74) Attorney, Agent, or Firm—Oliff & Berridge, PLC

(57) ABSTRACT

A DC motor is connected to diagonal positions of a bridge circuit having of four sides including switching elements and reflux diodes. At least one of two terminals is connected to a power line, and at least the other terminal is grounded. By performing pulse width modulation control of the switching elements, operation of the DC motor is controlled. When the DC motor is in operation, the sum of the terminal voltages of the DC motor is equal to the power voltage. When the DC motor is out of operation, the sum of the voltages is set to a predetermined voltage. If the sum of the voltages has deviated from the power voltage or the predetermined voltage by at least a predetermined value, the occurrence of a malfunction is judged.

14 Claims, 7 Drawing Sheets

PWM

Vm1'

Vm2'

Vm

Vm2

Vm1

MOTOR DRIVE UNIT AND METHOD OF DETECTING MALFUNCTION OF MOTOR DRIVE UNIT

INCORPORATION BY REFERENCE

The disclosure of Japanese Patent Application No. 11-252593 filed on Sep. 7, 1999 including the specification, drawings and abstract is incorporated herein by reference in its entirety.

BACKGROUND OF THE INVENTION

1. Field of the Invention

The invention relates to a motor drive unit which controls an electric motor through pulse width modulation (PWM) control and to detection of a malfunction for the motor drive unit.

2. Description of the Related Art

At present, there is a motor drive unit which controls an electric motor. The motor drive unit has a bridge circuit composed of four sides that each have a switching element. The electric motor has at least two ends connected to the switching elements that are diagonally positioned in relation to the bridge circuit. At least one of the switching elements is connected to a power line, and at least one of the other switching elements is grounded. The motor unit is driven by applying voltage to the power switching element. By performing pulse width modulation control of the switching elements, drive control of the electric motor is performed. In a drive unit of this type, if the sum of the terminal voltages of the electric motor becomes approximately equal to "0", i.e., equal to or smaller than a predetermined threshold value (e.g. approximately 3% of the battery voltage), it is determined whether or not the electric motor and the grounded line has been short-circuited (e.g. Japanese Patent Application Laid-Open No. 5-185937).

SUMMARY OF THE INVENTION

However, the aforementioned motor drive unit takes into account nothing but the possibility of the portion between one terminal of the electric motor and the grounded line being short-circuited. Therefore, this motor drive unit is useless when there is a malfunction occurring in a motor drive device, a malfunction detection controller, or the like.

The invention provides a motor drive unit and a method of detecting a malfunction thereof which make it possible to detect a wide variety of malfunctions relating to an electric motor by detecting various malfunctions in the electric motor, the motor drive device and the malfunction detection monitor device.

To achieve the aforementioned and/or other objects, a motor drive unit in accordance with a first exemplary embodiment of the present invention has a bridge circuit composed of four sides that each have a switching element. An electric motor having two ends is connected to the bridge circuit that is diagonally positioned in relation to the electric motor. At least one of the pair of switching elements is connected to a power line, and at least one of the other switching elements is grounded. The motor drive unit is driven by applying voltage to the power terminal. By performing pulse width modulation control of the switching elements, drive control of the electric motor is performed. The motor drive unit has a malfunction judgment controller which judges the occurrence of a malfunction when the sum of the terminal voltages of the electric motor is different from a power voltage by a predetermined value or more during operation of the electric motor.

In the thus-constructed first exemplary embodiment of the invention, if the electric motor, the motor drive device, and its marginal device including a malfunction detection controller are in normal operation, the sum Vm of terminal voltages Vm1, Vm2 at the ends of the electric motor is approximately equal to the power voltage Vb due to the operation of the bridge circuit. If the respective switching elements are short-circuited, the sum Vm assumes a value which is approximately equal to or greater than $3 \cdot Vb/2$ or a value which is approximately equal to or smaller than $Vb/2$. Further, even if the portions between respective ends of the electric motor and the grounded line or the power line are short-circuited, the sum Vm assumes a value which is approximately equal to or greater than $3 \cdot Vb/2$ or a value which is equal to or smaller than $Vb/2$. As a result, according to the invention, since the malfunction judgment controller judges the occurrence of a malfunction when the sum of the terminal voltages of the electric motor is different from the power voltage by a predetermined value or more, various malfunctions as mentioned above are detected. Thus, it is possible to provide a suitable countermeasure against those malfunctions.

Further, a second exemplary embodiment of the invention is applied to a motor drive unit which controls the electric motor by using the bridge circuit as mentioned above. The motor drive unit has a malfunction judgment controller which judges the occurrence of a malfunction when the electric motor is out of operation and when the sum of the terminal voltages of the electric motor is different from the sum of voltage values which has been determined in advance based on the voltage values at the ends of the electric motor during a turned-off state of all the switching elements by a predetermined value or more.

In the thus-constructed second exemplary embodiment of the invention, if the electric motor, the motor drive device and its marginal device including the malfunction detection controller are in normal operation, the sum Vm of the terminal voltages Vm1, Vm2 at the ends of the electric motor is equal to a predetermined voltage in a turned-off state of all the switching elements. For example, if the electric motor is grounded at one end through a pull-down resistor without connecting the electric motor at another end to the power line through a pull-up resistor, the sum Vm is equal to a ground voltage "0" (hereinafter referred to as a first mode). Further, if at least one of the ends of the electric motor is connected to the power line through the pull-up resistor and at least one of the other ends of the electric motor is grounded through the pull-down resistor, the sum Vm is equal to a value which is twice as great as a predetermined value between the power voltage Vb and the ground voltage "0" (equal to the power voltage Vb if the pull-up resistor and the pull-down resistor assume the same resistance value) (hereinafter referred to as a second mode). In addition, if the electric motor is connected to the power line through the pull-up resistor without grounding the ends of the electric motor through the pull-down resistor, the sum Vm is equal to the power voltage $2 \cdot Vb$ (hereinafter referred to as a third mode).

In the first mode, while the electric motor is out of operation as mentioned above, if portions between the switching elements on the side of the power line of the bridge circuit and the power line have been short-circuited, or if portions between the ends of the electric motor and the power line have been short-circuited, the sum Vm is approximately equal to $2 \cdot Vb$.

Further, in the second mode, while the electric motor is out of operation as mentioned above, if the switching elements of the bridge circuit have been short-circuited, the sum Vm is approximately equal to 2·Vb or "0". Further, if portions between the ends of the electric motor and the power line or the grounded line have been short-circuited, the sum Vm is approximately equal to 2·Vb or "0".

In addition, in the third mode, while the electric motor is out of operation as mentioned above, if portions between the switching elements on the grounded side of the bridge circuit and the grounded line have been short-circuited, or if portions between the ends of the electric motor and the grounded line have been short-circuited, the sum Vm is approximately equal to "0".

As a result, according to the second exemplary embodiment of the invention, the malfunction judgment controller judges the occurrence of a malfunction when the detected sum of the terminal voltages of the electric motor is different from the sum of voltage values which has been determined in advance based on the voltage values at the ends of the electric motor during a turned-off state of all the switching elements by at least a predetermined value. Thus, various malfunctions as described above are detected. That is, a wide variety of malfunctions relating to the electric motor are detected, whereby it becomes possible to provide a suitable countermeasure against those malfunctions.

Furthermore, according to a third exemplary embodiment of the invention, the motor drive unit has a malfunction judgment controller which approximately sets the terminal voltages at the ends of the electric motor to a lower power voltage during a turned-off state of all the switching elements by connecting at least one of the ends of the electric motor to the power line through the pull-up resistor and grounding at least the other end of the electric motor through the pull-down resistor and which judges the occurrence of a malfunction when the sum of the terminal voltages of the electric motor is different from the power voltage by a predetermined value or more.

In the thus-constructed third exemplary embodiment of the invention, if the electric motor, the motor drive device, and its marginal circuit including the malfunction detection controller are in normal operation, when the electric motor is in operation, the sum Vm of the terminal voltages Vm1, Vm2 at the ends of the electric motor is approximately equal to the power voltage Vb due to the operation of the bridge circuit. Further, when the electric motor is out of operation, the sum Vm of the terminal voltages Vm1, Vm2 at the ends of the electric motor is approximately equal to the power voltage Vb due to the operation of the pull-up resistor and the pull-down resistor.

Further, while the electric motor is in operation, if the switching elements have been short-circuited, the sum Vm assumes a value which is approximately equal to or to greater than 3·Vb/2 or a value which is approximately equal to or smaller than Vb/2. Further, while the electric motor is in operation, if portions between the ends of the electric motor and the grounded line or the power line have been short-circuited, the sum Vm assumes a value which is approximately equal to or greater than 3·Vb/2 or a value which is approximately equal to or smaller than Vb/2. Further, while the electric motor is out of operation, if switching elements of the bridge circuit have been short-circuited, the sum Vm is approximately equal to 2·Vb or "0". Further, while the electric motor is out of operation, if portions between the ends of the electric motor and the power line or the grounded line have been short-circuited, the sum Vm is approximately equal to 2·Vb or "0".

As a result, according to the third exemplary embodiment of the invention, the malfunction judgment controller judges the occurrence of a malfunction when the detected sum of the terminal voltages of the electric motor is different from the power voltage by at least a predetermined value. Thus, various malfunctions as mentioned above are detected. That is, a wide variety of malfunctions relating to the electric motor are detected, whereby it becomes possible to provide a suitable countermeasure against those malfunctions. Further, in this case, when the electric motor is out of operation, the sum of the terminal voltages at the ends of the electric motor is set equal to the power voltage by means of the pull-up resistor and the pull-down resistor. Thus, it is possible to simultaneously judge the occurrence of a malfunction based on one sort of judgment regardless of whether the electric motor is in operation or out of operation. Therefore, the judgment of a malfunction occurring in marginal devices of the motor drive unit can be made with ease.

Further, according to another exemplary embodiment of the invention, there is provided a method of detecting a malfunction for a motor drive unit which has a bridge circuit composed of four sides including switching elements, an electric motor whose ends are connected to a pair of terminals at diagonal positions of the bridge circuit, a power circuit which applies a power voltage to a pair of terminals by connecting one of the terminals at the other diagonal positions to a power line and grounding the other terminal, and a motor drive device which controls the electric motor by performing pulse width modulation control of the switching elements. In the method of detecting a malfunction, the sum of the terminal voltages of the electric motor is detected, and the occurrence of a malfunction in at least one of the bridge circuit, the electric motor and the motor drive device is judged if the sum of the terminal voltages of the electric motor is different from the power voltage by at least a predetermined value during operation of the electric motor.

Further, in a method of detecting a malfunction in accordance with still another exemplary embodiment of the invention, the sum of the terminal voltages of the electric motor is detected, and the occurrence of a malfunction in at least one of the bridge circuit, the electric motor and the motor drive device is judged when the electric motor is out of operation and when the sum of the terminal voltages of the electric motor is different from the sum of voltage values which has been determined in advance based on the voltage values at the ends of the electric motor during a turned-off state of all the switching elements by a predetermined value or more.

Further, in a method of detecting a malfunction in accordance with still another exemplary embodiment of the invention, terminal voltages at the ends of the electric motor are set to a lower power voltage during a turned-off state of all the switching elements by connecting at least one of the ends of the electric motor to the power line through a pull-up resistor and grounding at least the other of the ends of the electric motor through a pull-down resistor, and the sum of the terminal voltages of the electric motor is detected, and the occurrence of a malfunction in at least one of the bridge circuit, the electric motor and the motor drive device is judged if the sum of the terminal voltages of the electric motor is different from the power voltage by a predetermined value or more.

BRIEF DESCRIPTION OF THE DRAWINGS

The foregoing and further objects, features and advantages of the invention will become apparent from the following description of a preferred embodiment with reference to the accompanying drawings, wherein.

DETAILED DESCRIPTION OF PREFERRED EMBODIMENT

Figure 1:
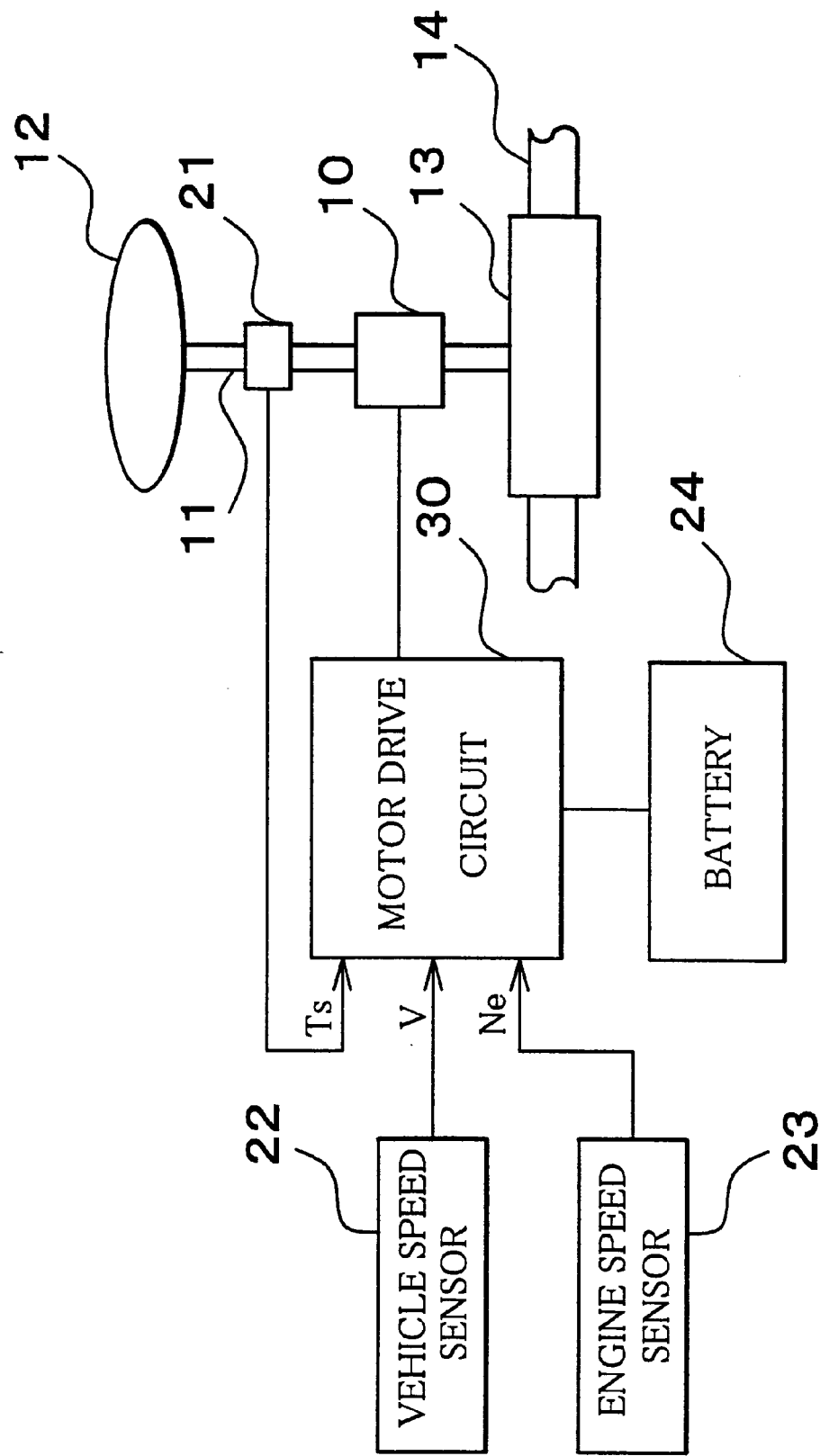
FIG. 1 schematically shows the entire vehicular motor-driven power steering device to which an electric control device for an AC motor in accordance with one embodiment of the invention is applied.

Hereinafter, one embodiment of the invention will be described with reference to the drawings. FIG. 1 schematically shows a vehicular motor-driven power steering device to which a motor drive unit in accordance with the invention is applied.

This motor-driven power steering device has a DC motor 10 serving as an electric motor.

The DC motor 10 is mounted to an intermediate portion of a steering shaft 11 to rotate the steering shaft 11, and applies an assisting force to assist the steering of front wheels by rotational operation of a steering handle 12. A lower end portion of the steering shaft 11 is connected to a tie rod 14 in a steering gear box 13 in a manner allowing power transmission. The tie rod 14 is axially displaced due to rotation of an axis of the steering shaft 11. Front wheels (not shown) are steerably connected to the ends of the tie rod 14. The front wheels are laterally steered due to axial displacement of the tie rod 14.

A steering torque sensor 21 is mounted to the steering shaft 11. The sensor 21 detects a steering torque Ts acting on the steering shaft 11, and supplies the detected steering torque Ts to a motor drive circuit 30. A vehicle speed sensor 22 for detecting a vehicle speed V, an engine speed sensor 23 for detecting an engine speed Ne, and a battery 24 are connected to the motor drive circuit 30.

Figure 2:
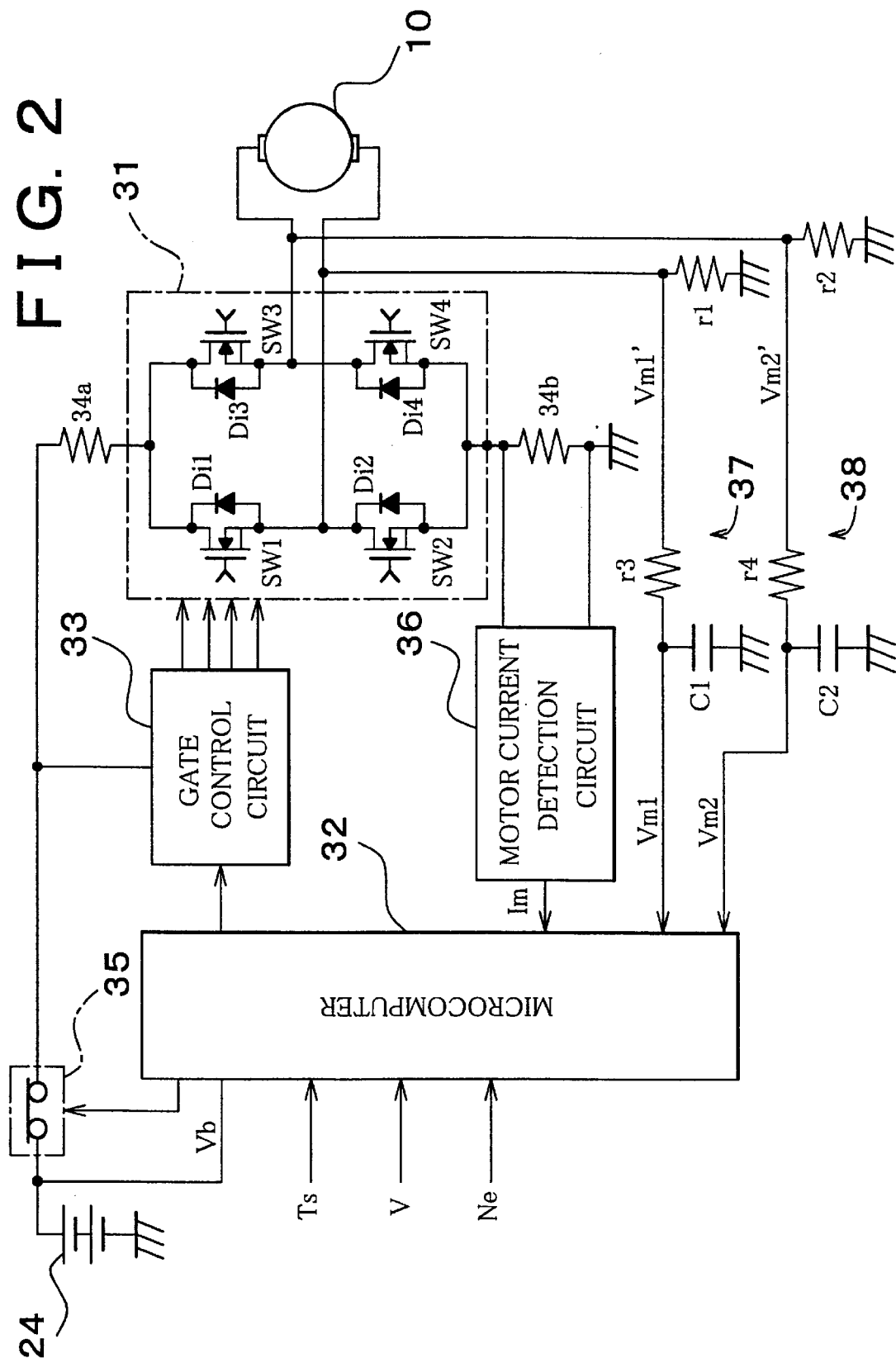
FIG. 2 is a detailed block diagram of a drive circuit shown in FIG. 1.

As shown in FIG. 2, the motor drive circuit 30 has a bridge circuit 31 and a microcomputer 32. The bridge circuit 31 has four sides with switching elements SW1 through SW4 composed of a field effect transistor (FET). Reflux diodes D11 through D14 are connected in parallel to the switching elements SW1 through SW4. The switching elements SW1 through SW4 are controlled to be turned on and off by respective pulse-train signals from a gate control circuit 33.

Out of a pair of terminals located at diagonal positions of the bridge circuit 31, one of the terminals that is a junction point of the switching elements SW1, SW3 is connected to a battery 24 through a shunt resistor 34a and a relay switch circuit 35. The other terminal that is a junction point of the switching elements SW2, SW4 is grounded through a shunt resistor 34b. Resistance values of the shunt resistors 34a, 34b are set to relatively small values. A junction point of the switching elements SW1, SW2 and a junction point of the switching elements SW3, SW4, which are a pair of terminals located at bridge circuit 31, are connected to the ends of the DC motor 10 and grounded through pull-down resistors r1, r2.

The shunt resistor 34b is connected at both ends to a motor current detection circuit 36. The detection circuit 36 detects a motor current Im flowing through the DC motor 10 by a voltage which is produced at both ends of the shunt resistor 34b, and supplies the detected motor current Im to the microcomputer 32. A low-pass filter composed of a resistor r3 and a capacitor C1 is connected to the pull-down resistor r1. The resistors r1, r3 and the capacitor C1 constitute a terminal voltage detection circuit 37. The terminal voltage detection circuit 37, which functions as a low-pass filter as described above, removes high-frequency components from the voltage Vm1' at one end of the DC motor 10 and supplies a first terminal voltage Vm1 to the microcomputer 32. A low-pass filter composed of a resistor r4 and a capacitor C2 is connected to the pull-down resistor r2. The resistors r2, r4 and the capacitor C2 constitute a terminal voltage detection circuit 38. The terminal voltage detection circuit 38, which also functions as a low-pass filter, removes high-frequency components from the voltage Vm2' at the other end of the DC motor 10 and supplies a second terminal voltage Vm2 to the microcomputer 32.

In addition to the motor current Im and the first and second terminal voltages Vm1, Vm2, the microcomputer 32 is supplied with a battery voltage Vb from the battery 24, a steering torque Ts from the steering torque sensor 21, a vehicle speed V from the vehicle speed sensor 22, and an engine speed Ne from the engine speed sensor 23. The microcomputer 32 repeatedly executes a program shown in FIG. 3 at intervals of a predetermined short period, and controls operation of the DC motor 10 by supplying a pulse width modulation (PWM) control signal to the gate control circuit 33. Then, the microcomputer 32 detects a malfunction of the DC motor 10, the motor drive circuit 30, or the like. Upon detection of the malfunction, the microcomputer 32 also controls the relay switch circuit 35.

Next, operation of the embodiment constructed as described above will be described. If a voltage is supplied from the battery 24 to the microcomputer 32 by turning an ignition switch (not shown) on, the microcomputer 32 executes a program (not shown) and thereby determines whether to control the DC motor 10 in accordance with states of the battery 24 and the motor 10. If it is determined that the motor 10 may be controlled, the microcomputer 32 turns the relay switch circuit 35 on. Thus, a voltage from the battery 24 is supplied to the bridge circuit 31, the gate control circuit 33 through the relay switch circuit 35. Hereinafter, the following description will be made as to the case where the relay switch circuit 35 has been turned on. After the relay switch circuit 35 has been turned on, the microcomputer 32 starts executing the program shown in FIG. 3 at intervals of a predetermined short period.

The execution of this program is started in STEP 100. In STEP 102, an engine speed Ne from the engine speed sensor 23 is inputted to the microcomputer 32. Based on the inputted engine speed Ne, the microcomputer 32 determines whether to permit steering assist by the DC motor 10. If the engine speed Ne does not remain equal to or higher than a predetermined speed for more than a predetermined period, the result in STEP 102 is judged to be "NO". Then, the program proceeds to STEP 104. In STEP 104, the DC motor 10 is controlled to be stopped. In other words, assist control by the motor 10 is stopped. Then, the execution of this program is terminated in STEP 134.

If the engine speed Ne remains equal to or higher than the predetermined speed for more than the predetermined period, the result in STEP 102 is judged to be "YES". Then, the program proceeds to STEP 106 and the subsequent STEPS. In STEP 106, first and second terminal voltages Vm1, Vm2 are inputted from the terminal voltage detection circuits 37, 38. The first and second terminal voltages Vm1, Vm2 are summated so that the sum of the terminal voltages Vm=Vm1+Vm2 is calculated. Next, a motor current Im is inputted from the motor current detection circuit 36 in STEP 108. Depending whether or not the motor current Im is equal to or greater than a predetermined small current value Im0, it is determined whether or not the DC motor 10 is in operation.

If the DC motor 10 is in operation and the motor current Im is equal to or greater than a predetermined current Im0, the result in STEP 108 is judged to be "YES". Then, the program proceeds to STEP 110 and the subsequent STEPS. On the other end, if the DC motor 10 is out of operation and the motor current Im is smaller than the predetermined current value 110 (approximately equal to "0"), the result in STEP 108 is judged to be "NO". Then, the program proceeds to STEP 122 and the subsequent STEPS.

In STEP 110, a second count value CT2, which is used to judge the occurrence of a malfunction when the DC motor 10 is out of operation, is reset to "0". After that, it is determined in STEPS 112, 114 whether or not the sum Vm of the terminal voltages is approximately equal to the battery voltage Vb. That is, it is determined in STEP 112 whether or not the sum Vm is equal to or greater than a value obtained by adding a predetermined voltage value $\Delta$Vb to the battery voltage Vb, i.e., Vb+$\Delta$Vb. Further, it is determined in STEP 114 whether or not the sum Vm is equal to or smaller than a value obtained by subtracting the predetermined voltage value $\Delta$Vb from the battery voltage Vb, i.e., Vb−$\Delta$Vb. In this case, although a voltage inputted from the battery 24 may be used as the battery voltage Vb, it is also possible to use a value which has suitably been determined in advance.

If the sum Vm of the first and second terminal voltages Vm1, Vm2 is approximately equal to the battery voltage Vb, the results in STEPS 112, 114 are judged to be "NO". Then, in STEP 116, a first count value CT1, which is used to judge the occurrence of a malfunction when the DC motor 10 is in operation, is reset to "0". Then, the program proceeds to STEP 132. In STEP 132, a steering torque Ts is inputted from the steering torque sensor 21, and a vehicle speed V is inputted from the vehicle speed sensor 22. Operation of the DC motor 10 is controlled in accordance with the inputted steering torque Ts and vehicle speed V. To be more specific, a command current value I* for the DC motor 10, whose absolute value increases in accordance with an increase in absolute value |Ts| of the steering torque Ts and decreases in accordance with an increase in vehicle speed V and whose sign (positive or negative) corresponds to a direction of the steering torque Ts, is calculated. Then, a control signal indicative of a pulse-train signal which has been subjected to pulse width modulation (PWM) for on-off control of the switching elements SW1 through SW4 is formed, so that a current equal to the command current value I* flows through the DC motor 10. The control signal is outputted to the gate control circuit 33. In forming the control signal, the motor current Im of the DC motor 10 detected by the motor current detection circuit 36 may be used as a feedback control amount.

Figure 4A:
FIG. 4A is a time chart showing a pulse width modulation (PWM) control signal PWM for performing switching control of a bridge circuit shown in FIG. 2.
Figure 4B:
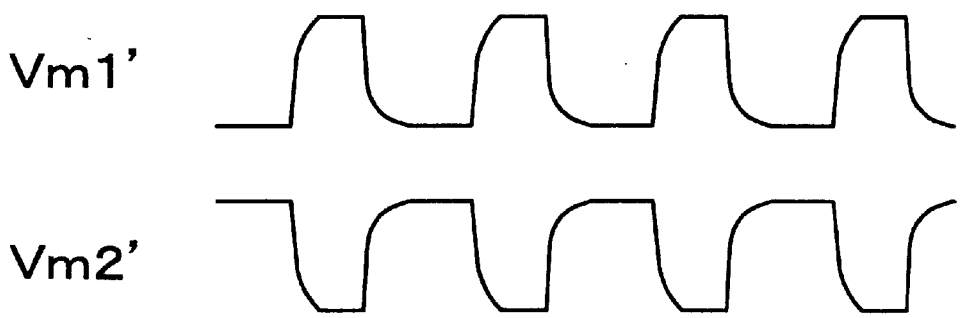
FIG. 4B is a time chart showing voltages Vm1', Vm2' at the terminals of a DC motor.
Figure 4C:
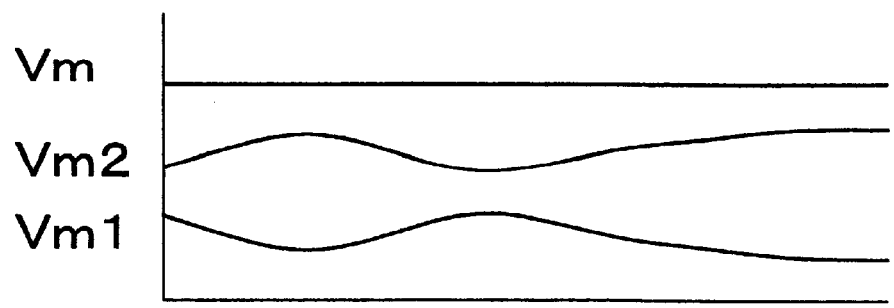
FIG. 4C is a time chart showing first and second terminal voltages Vm1, Vm2, which are outputs from a terminal voltage detection circuit, and the sum Vm of the terminal voltages.
Figure 5A:
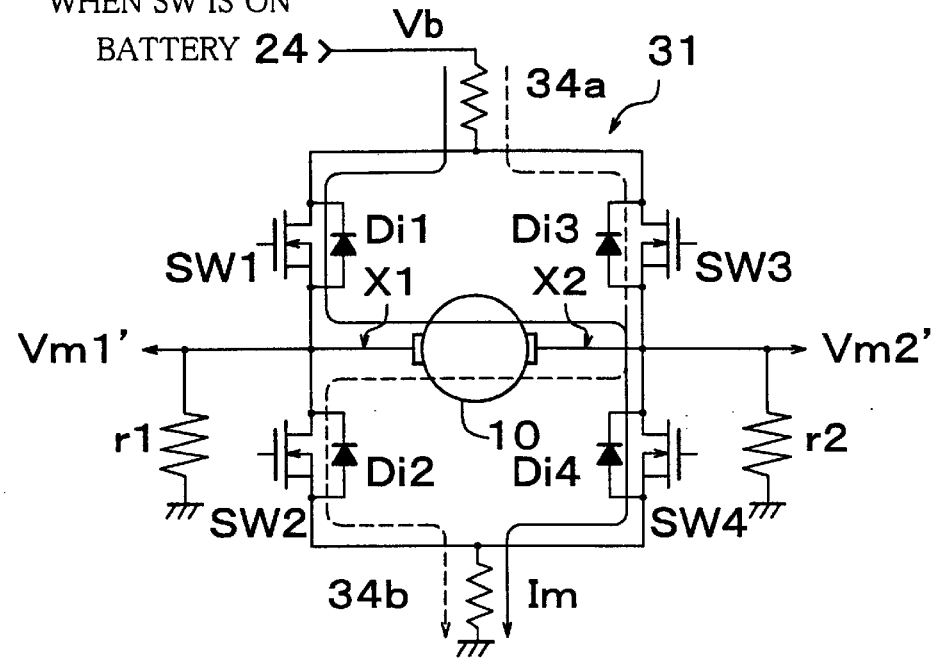
FIGS. 5A and 5B are explanatory views for explaining operation of the bridge circuit shown in FIG. 2.
Figure 5B:
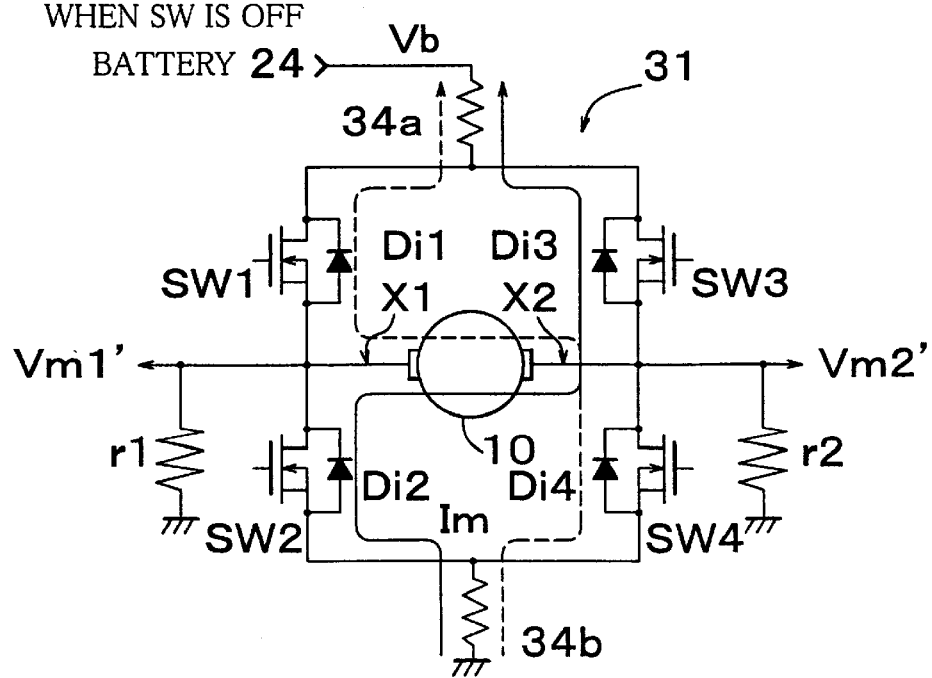

In response to the control signal that has been supplied, the gate control circuit 33 outputs pulse-train signals for on-off control of the switching elements SW1 through SW4 to the switching elements SW1 through SW4. During this control, when the DC motor 10 is rotated in the normal direction, a pulse-train signal PWM shown in FIG. 4A is supplied to the switching elements SW1, SW4. While the switching elements SW1, SW4 are controlled to be turned on and off in accordance with the pulse-train signal PWM, the switching elements SW2, SW3 remain turned off. Thus, when the pulse-train signal is at high level, the motor current Im flows from the battery 24 to the ground through the shunt resistor 34a, the switching element SW1, the DC motor 10, the switching element SW4 and the shunt resistor 34b, as indicated by a solid line in FIG. 5A. If the pulse-train signal shifts from high level to low level, the motor current Im flows from the ground to the battery 24 through the shunt resistor 34b, a reflux diode D12, the DC motor 10, a reflux diode D13 and the shunt resistor 34a due to magnetic action of the electric motor, as indicated by a solid line in FIG. 5B. As a result, the voltages Vm1', Vm2' at the ends of the DC motor 10 have wave shapes as shown in FIG. 4B, and the first and second terminal voltages Vm1, Vm2, which are outputted from the terminal voltage detection circuits 37, 38 functioning as a low pass filter, have wave shapes as shown in FIG. 4C. FIGS. 4B and 4C conceptualize the voltages Vm1', Vm2', Vm1 and Vm2 in an exaggerative manner.

Further, when the DC motor 10 is rotated in the reverse direction, the pulse-train signal PWM shown in FIG. 4A is supplied to the switching elements SW2, SW3. While the switching elements SW2, SW3 are controlled to be turned on and off in accordance with the pulse-train signal PWM, the switching elements SW1, SW4 remain turned off. Thus, when the pulse-train signal is at high level, the motor current Im flows from the battery 24 to the ground through the shunt resistor 34a, the switching element SW3, the DC motor 10, the switching element SW2 and the shunt resistor 34b, as indicated by a broken line in FIG. 5A. If the pulse-train signal PWM shifts from high level to low level, the motor current Im flows from the ground to the battery 24 through the shunt resistor 34b, a reflux diode D14, the DC motor 10, a reflux diode D11 and the shunt resistor 34a due to magnetic action of the electric motor 10, as indicated by a broken line in FIG. 5B. As a result, the voltages Vm1', Vm2' at the ends of the DC motor 10 have wave shapes in inverse relation to those shown in FIG. 4B, and the first and second terminal voltages Vm1, Vm2, which are outputted from the terminal voltage detection circuits 37, 38 functioning as a low pass filter, have wave shapes in inverse relation to those shown in FIG. 4C.

In this manner, when operation of the DC motor 10 is controlled through pulse width modulation (PWM), the on-period of the switching elements SW1 through SW4 is in inverse relation to the off-period of the switching elements SW1 through SW4. The sum of the first and second terminal voltages Vm1, Vm2 of the DC motor 10 (i.e. Vm1+Vm2) is approximately equal to the battery voltage Vb. In particular, since the terminal voltage detection circuits 37, 38 function as a low pass filter, the sum Vm is stabilized. Also, when the program shown in FIG. 3 is executed again, the results in STEPS 112, 114 are judged to be "NO". Thus, the aforementioned processings in STEPS 100, 102, 106 through 116, 132 and 134 are performed, and the DC motor 10 steerably assists rotational operation of the steering handle 12.

Further, while operation of the DC motor 10 is thus controlled, if a malfunction occurs in the motor 10, the motor drive circuit 30 and its marginal circuit, the sum Vm of the first and second terminal voltages Vm1, Vm2 deviates from the battery voltage Vb. Examples of this malfunction will be cited below in (1) through (9). In these examples, as shown in FIG. 5, the description will be limited to the case where the switching elements SW1, SW4 are controlled to be turned on and off and where the switching elements SW2, SW3 remain turned off (as indicated by a solid line in FIG. 5). The description of the case where the switching elements SW2, SW3 are controlled to be turned on and off and where the switching elements SW1, SW4 remain turned off (as indicated by a broken line in FIG. 5) will be omitted. This is because the same applies to each pair of components which are disposed symmetrically to each other. Further, numerical examples of the voltages Vm1', Vm2' at the ends of the DC motor 10 and the sum Vm of the first and second terminal voltages Vm1, Vm2 are given on the premise that the duty ratio during on-off control of the switching elements SW1, SW4 is approximately equal to 50%.

(1) If the switching element SW1 has been short-circuited, the voltage Vm1' at one end of the DC motor 10 is always approximately equal to Vb, and the voltage Vm2' at the other end of the motor 10 is generally switched between "0" and Vb in synchronization with the turning-on and turning-off of the switching elements SW1, SW4. Hence, the sum Vm of the first and second terminal voltages Vm1, Vm2 is approximately equal to 3·Vb/2.

(2) If the switching element SW2 has been short-circuited between its terminal and a power line, the voltage Vm1' at one end of the DC motor 10 is switched between "0" and a value which is at most approximately equal to Vb/2 in synchronization with the turning-on and turning-off of the switching elements SW1, SW4, and the voltage Vm2 at the other end of the motor 10 is always approximately equal to "0". Hence, the sum Vm of the first and second terminal voltages Vm1, Vm2 is at most approximately equal to Vb/4.

(3) If the switching element SW3 has been short-circuited between its terminal and a grounded line, the voltage Vm1' at one end of the DC motor 10 is always approximately equal to Vb, and the voltage Vm2' at the other end of the motor 10 is switched between a value which is at least approximately equal to Vb/2 and a value which is approximately equal to Vb. Hence, the sum Vm of the first and second terminal voltages Vm1, Vm2 is at least approximately equal to 7·Vb/4.

(4) If the switching element SW4 has been short-circuited between its terminal and the grounded line, the voltage Vm1' at one end of the DC motor 10 is switched between "0" and a value which is approximately equal to Vb in synchronization with the turning-on and turning-off of the switching elements SW1, SW4, and the voltage Vm2' at the other end of the motor 10 is always approximately equal to "0". Hence, the sum Vm of the first and second terminal voltages Vm1, Vm2 is approximately equal to Vb/2.

(5) If one end X1 of the DC motor 10 and the power line of the battery 24 has been short-circuited (if a wiring harness at the other end X1 and the power line has been short-circuited), the voltage Vm1' at one end of the DC motor 10 is always approximately equal to Vb, and the voltage Vm2' at the other end of the motor 10 is generally switched between "0" and Vb in synchronization with the turning-on and turning-off of the switching elements SW1, SW4. Hence, the sum Vm of the first and second terminal voltages Vm1, Vm2 is approximately equal to 3·Vb/2.

(6) If one end X1 of the DC motor 10 and the grounded line has been short-circuited (if the wiring harness at the other end X1 and the grounded line has been short-circuited), the voltage Vm1' at one end of the motor 10 is switched between "0" and a value which is at most approximately equal to Vb/2 in synchronization with the turning-on and turning-off of the switching elements SW1, SW4, and the voltage Vm2' at the other end of the motor 10 is always approximately equal to "0". Hence, the sum Vm of the first and second terminal voltages Vm1, Vm2 is at most equal to Vb/4.

(7) If the other end X2 of the DC motor 10 and the power line of the battery 24 has been short-circuited (if the wiring harness at the other end X2 and the power line has been short-circuited), the voltage Vm1' at one end of the DC motor 10 is always approximately equal to Vb, and the voltage Vm2' at the other end of the motor 10 is switched between a value which is at least approximately equal to Vb/2 and a value which is approximately equal to Vb in synchronization with the turning-on and turning-off of the switching elements SW1, SW4. Hence, the sum Vm of the first and second terminal voltages Vm1, Vm2 is at least approximately equal to 7·Vb/4.

(8) If the other end X2 of the DC motor 10 and the grounded line has been short-circuited (if the wiring harness at the other end X2 and the grounded line has been short-circuited), the voltage Vm1' at one end of the motor 10 is generally switched between Vb and "0" in synchronization with the turning-on and turning-off of the switching elements SW1, SW4, and the voltage Vm2' at the other end of the motor 10 is always approximately equal to "0". Hence, the sum Vm of the first and second terminal voltages Vm1, Vm2 is approximately equal to Vb/2.

(9) If a malfunction occurs in the terminal voltage detection circuits 37, 38 and the microcomputer 32, a value which is greatly different from Vb may be calculated as the sum Vm of the first and second terminal voltages Vm1, Vm2.

If a malfunction as described in the examples (1) through (9) occurs during operation of the DC motor 10, the sum Vm of the first and second terminals Vm1, Vm2 is approximately equal to or greater than 3·Vb/2, or approximately equal to or smaller than Vb/2. Thus, if the predetermined value ΔVb in STEPS 112, 114 is set to a value smaller than Vb/2, it is possible to detect a malfunction as described in the examples (1) through (8). To be more specific, it is desirable to set a value which is approximately equal to 25% of the battery voltage Vb (e.g. 12V), i.e., Vb/4 (e.g. 3V) as the predetermined value ΔVb.

Hereinafter, the flowchart shown in FIG. 3 will be described again. If a malfunction as described in the examples (1) through (9) occurs, the processings in STEPS 102, 106 through 110 are performed, and the result in STEP 112 or STEP 114 is judged to be "YES". In STEP 118, "1" is added to the first count value CT1. Then it is determined in STEP 120 whether or not the first count value CT1 is equal to or greater than a predetermined value CT10. If the first count value CT1 is smaller than the predetermined value CT10, the result is judged to be "NO" in STEP 120. Then, the aforementioned assist control processing in STEP 132 is performed. Thus, if a malfunction as described in the examples (1) through (9) has simply been detected temporarily, a later-described fail processing is not performed.

Further, if the aforementioned malfunction has been detected continuously and not temporarily, the first count value CT1 increases through the processing in STEP 118 every time this program is executed. If the count value CT1 becomes equal to or greater than the predetermined value CT10 due to an increase in the first count value CT1, the result in STEP 120 is judged to be "YES". Then, the program proceeds to STEP 136 and the subsequent STEPS.

In STEP 136, operation control of the DC motor 10 is stopped, and the relay switch circuit 35 is turned off. Then, a warning lamp (not shown) is lit up, and a fail processing, for example, of recording a state of malfunction that has occurred as a diagnostic code is performed. Then, execution of this program is terminated in STEP 138. In this case, unlike the case with the aforementioned processing in STEP 134, this program is not executed again after the processing in STEP 138. In this case, it is also possible to prohibit only the processing of driving the DC motor 10 and continue the processings in the program as usual.

As a result, the occurrence of a malfunction during operation of the DC motor 10 is detected, and assist control by the motor 10 is stopped upon detection of the malfunction. Therefore, it is possible to ensure running stability of the vehicle. In detecting the occurrence of a malfunction, the judgment is made by comparing the sum Vm of the first and second terminal voltages Vm1, Vm2 with the battery voltage Vb. Thus, various malfunctions as described in the examples (1) through (9) can efficiently be detected. Further, since the occurrence of a malfunction is judged on condition that detection of the malfunction continue for a period corresponding to the predetermined value CT 10, it is possible to eliminate the possibility of misjudgment ascribed to the temporary emergence of a malfunction. Consequently, it is possible to detect the occurrence of a malfunction in peripheral equipments of the motor drive unit with high reliability.

Next, it will be described how to judge the occurrence of a malfunction when the DC motor 10 is out of operation. In this case, since the motor current Im is equal to "0", the result in STEP 108 is judged to be "NO". In other words, it is determined in STEP 108 that the motor current Im is smaller than the predetermined current value Im0. Then, the program proceeds to STEP 122 and the subsequent STEPS. After the first count value CT1 has been reset to "0" in STEP 122, it is determined in STEP 124 whether or not the sum Vm of the first and second terminal voltages Vm1, Vm2 is equal to or greater than a predetermined voltage value ΔV. That is, it is determined in STEP 124 whether or not the sum Vm is approximately equal to "0".

If the sum Vm of the first and second terminal voltages Vm1, Vm2 is approximately equal to "0" and smaller than the predetermined voltage value ΔV, the result in STEP 124 is judged to be "NO". Then, after the second count value CT2 has been reset to "0" in STEP 126, the program proceeds to STEP 132. In STEP 132, the processing of controlling operation of the DC motor 10 is performed. However, since the motor 10 is actually out of operation, there is no processing performed to control operation of the motor 10.

When the DC motor 10 is out of operational control in this manner, the switching elements SW1 through SW4 remain turned off. Thus, if the motor 10, the motor drive circuit 30, and its marginal circuit operate normally, the first and second terminal voltages Vm1, Vm2 are both equal to "0". Also, the sum of the first and second terminal voltages Vm1, Vm2, i.e., Vm=Vm1+Vm2 remains equal to "0". As a result, in this case, even if the program shown in FIG. 3 has been executed again, the result in STEP 124 is judged to be "NO". Thus, the aforementioned processings in STEPS 100, 102, 106, 108, 122 through 126, 132 and 134 are performed.

Further, when the DC motor 10 is out of operation in this manner, if a malfunction occurs in the motor 10, the motor drive circuit 30, or its marginal circuit, the sum Vm of the first and second terminal voltages Vm1, Vm2 of the DC motor 10 deviates from "0". Examples of this malfunction will be cited below in (1) through (3).

(1) If the switching element SW1 or the switching element SW3 and the power line has been short-circuited, the voltages Vm1', Vm2' at the ends of the DC motor 10 are approximately equal to Vb. Hence, the sum Vm of the first and second terminal voltages Vm1, Vm2 is approximately equal to 2·Vb.

(2) If one end X1 or the other end X2 of the DC motor 10 and the power line of the battery 24 has been short-circuited (if the wiring harness at one end X1 or the other end X2 and the power line has been short-circuited), the voltages Vm1', Vm2' at the ends of the DC motor 10 are approximately equal to Vb. Hence, the sum Vm of the first and second terminal voltages Vm1, Vm2 is approximately equal to 2·Vb.

(3) If a malfunction occurs in the terminal voltage detection circuits 37, 38 or the microcomputer 32, a value which is greatly different from "0" may be calculated as the sum Vm of the first and second terminal voltages Vm1, Vm2.

Figure 3:
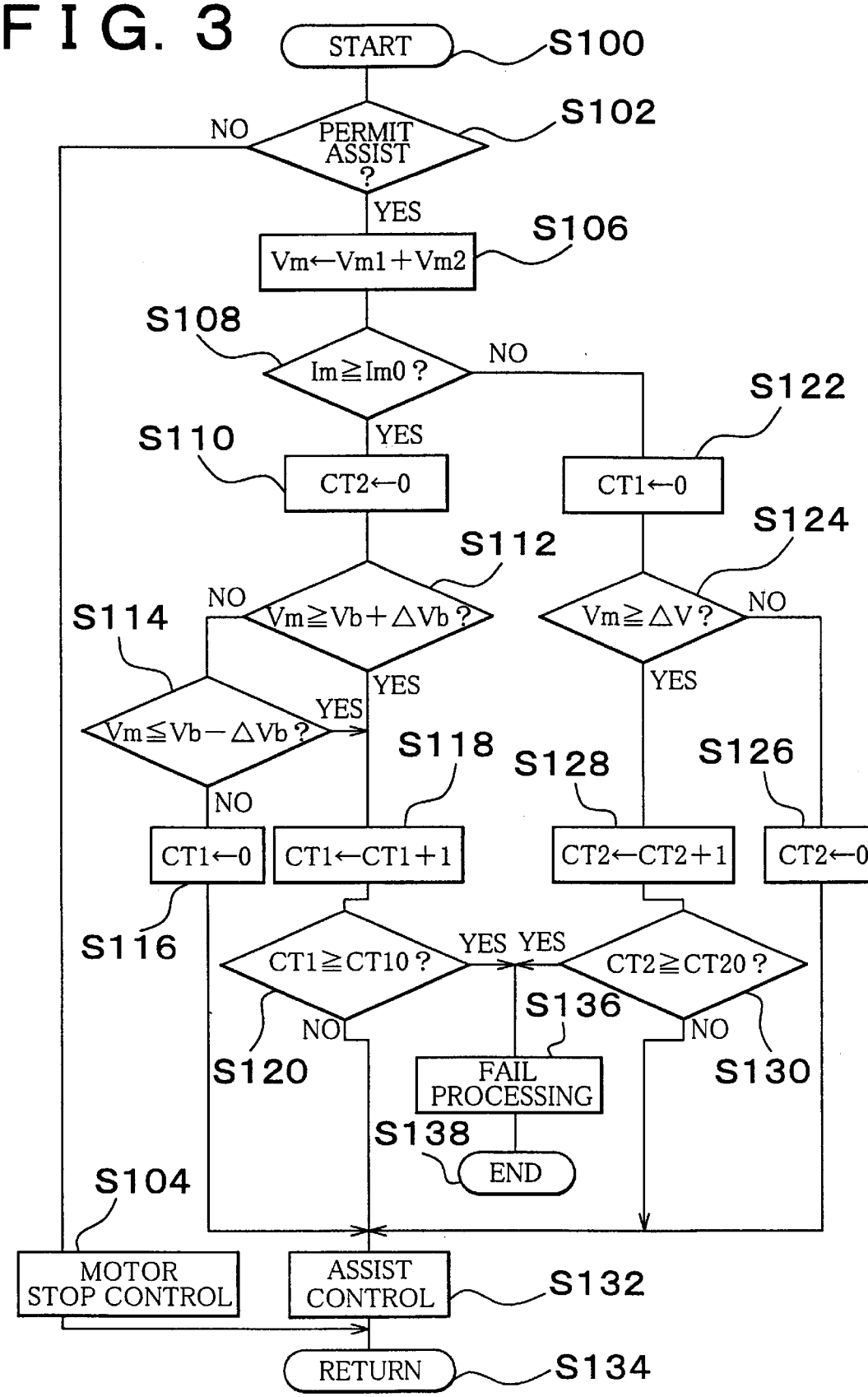
FIG. 3 is a flowchart of a program executed by a microcomputer shown in FIG. 2.

In this manner, if a malfunction as described in the examples (1) through (3) occurs when the DC motor 10 is out of operation, the sum Vm of the first and second terminal voltages Vm1, Vm2 deviates from "0". Thus, if the predetermined voltage value ΔV in STEP 124 of FIG. 3 is suitably set to a small value, it is possible to detect a malfunction as described in the examples (1) through (3).

Hereinafter, the flowchart shown in FIG. 3 will be described. If a malfunction as described in the examples (1) through (3) occurs, the processings in STEPS 102, 106, 108 and 122 are performed and then the result in STEP 124 is judged to be "YES". In STEP 128, "1" is added to the second count value CT2. Then, it is determined in STEP 130 whether or not the second count value CT2 is equal to or greater than a predetermined value CT20. If the second count value CT2 is smaller than the predetermined value CT20, the result in STEP 130 is judged to be "NO". Then, the aforementioned assist control processing in STEP 132 is performed. Thus, if a malfunction as described in the examples (1) through (3) has simply been detected temporarily, the aforementioned fail processing in STEP 136 is not performed.

Further, if the aforementioned malfunction has been detected continuously and not temporarily, the second count value CT2 increases through the processing in STEP 128 every time this program is executed. If the count value CT2 becomes equal to or greater than the predetermined value CT20 due to an increase in the second count value CT2, the result in STEP 130 is judged to be "YES". Then, the program proceeds to STEP 136 and the subsequent STEPS.

In STEP 136, the aforementioned fail processing is performed. Then, in STEP 138, execution of this program is terminated. Also in this case, this program is not executed again after the aforementioned processing in STEP 138. Also in this case, it is possible to prohibit only the processing of driving the DC motor 10 and continue the processings in the program as usual.

As a result, the occurrence of a malfunction during an inoperative state of the DC motor 10 is detected, and assist control by the motor 10 is stopped upon detection of the malfunction. Therefore, it is possible to ensure running stability of the vehicle. In detecting the occurrence of a malfunction, the judgment is made by comparing the sum Vm of the first and second terminal voltages Vm1, Vm2 with "0". Thus, various malfunctions as described in the examples (1) through (9) can efficiently be detected. Further, since the occurrence of a malfunction is judged on condition that detection of the malfunction continue for a period corresponding to the predetermined value CT20, it is possible to eliminate the possibility of misjudgment ascribed to the temporary emergence of a malfunction. Consequently, it is possible to detect the malfunction with high reliability.

Next, a partially modified example of the motor drive circuit 30 in the aforementioned example will be described.

Figure 6:
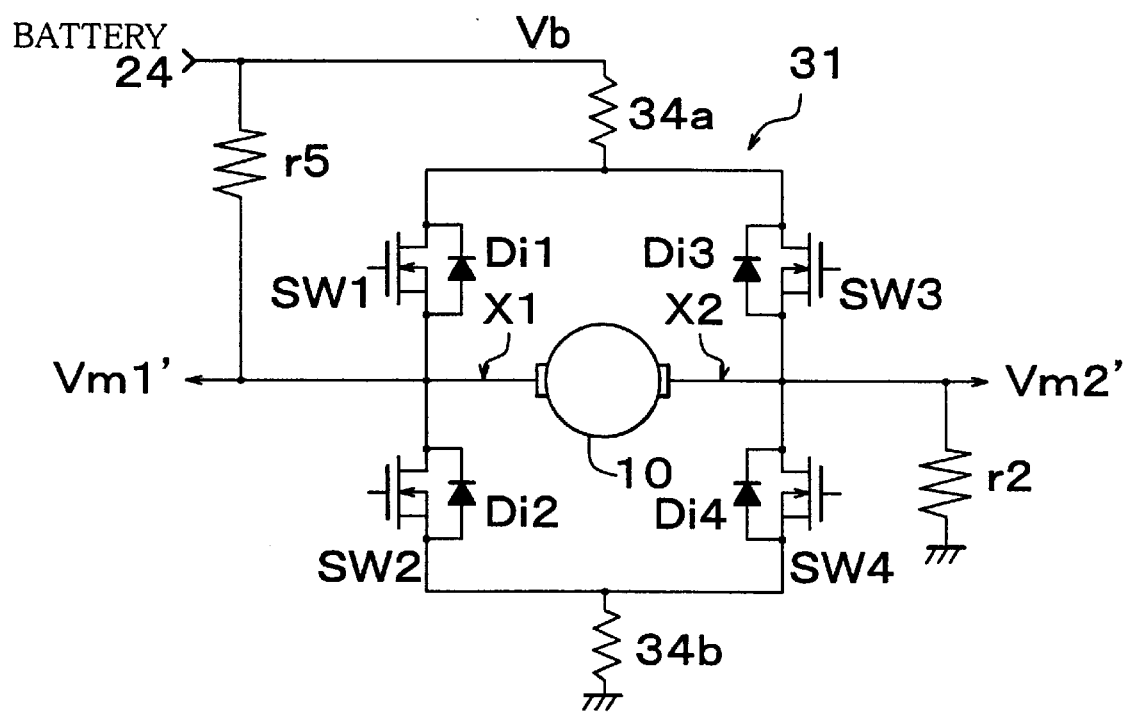
FIG. 6 is a diagram of a bridge circuit and its marginal circuit in accordance with a modification example of the embodiment.

As shown in FIG. 6, this modification example dispenses with the pull-down resistor r1 of the aforementioned embodiment. Instead, the DC motor 10 is connected at one end to the power line of the battery 24 through a pull-up resistor r5. In other respects, the construction of the circuit of this modification example is the same as that of the aforementioned embodiment.

Also in this modification example, the switching elements SW1, SW4 or the switching elements SW2, SW3 in the bridge circuit 31 are controlled to be turned on and off, whereby operation of the DC motor 10 is controlled.

In that case, the operation is substantially the same as in the aforementioned embodiment. That is, the voltages Vm1', Vm2' at the ends of the motor 10 are alternately switched between a value which is approximately equal to "0" and a value which is approximately equal to Vb, and the sum Vm of the first and second terminal voltages Vm1, Vm2 is also approximately equal to Vb. If a malfunction as described in the examples (1) through (3) occurs during operation of the DC motor 10, the voltages Vm1', Vm2' at the ends of the motor 10 and the sum Vm of the first and second terminal voltages Vm1, Vm2 assume the values mentioned in the examples (1) through (3).

However, when the switching elements SW1, SW4 and the switching elements SW2, SW3 remain turned off and the DC motor 10 is out of operation, the voltages Vm1', Vm2' at the ends of the motor 10 are approximately equal to Vb/2, and the sum Vm of the first and second terminal voltages Vm1, Vm2 is approximately equal to Vb. In this case, it is possible to detect a malfunction as described in the following examples (1) through (5).

(1) If the switching element SW1 or the switching element SW3 and the power line has been short-circuited, the voltages Vm1', Vm2' at the ends of the DC motor 10 are approximately equal to Vb. Hence, the sum Vm of the first and second terminal voltages Vm1, Vm2 is approximately equal to 2·Vb.

(2) If the switching element SW2 or the switching element SW4 and the grounded line has been short-circuited, the voltages Vm1', Vm2' at the ends of the DC motor 10 are approximately equal to "0". Hence, the sum Vm of the first and second terminal voltages Vm1, Vm2 is approximately equal to "0".

(3) If one end X1 or the other end X2 of the DC motor 10 and the power line of the battery 24 has been short-circuited (if the wiring harness at one end X1 or the other end X2 and the power line has been short-circuited), the voltages Vm1', Vm2' at the ends of the DC motor 10 are approximately equal to Vb. Hence, the sum Vm of the first and second terminal voltages Vm1, Vm2 is approximately equal to 2·Vb.

(4) If the DC motor 10 has been short-circuited at one end X1 or the other end X2 (if the wiring harness at one end X1 or the other end X2 and the grounded line has been short-circuited), the voltages Vm1', Vm2' at the ends of the DC motor 10 are always approximately equal to "0". Hence, the sum Vm of the first and second terminal voltages Vm1, Vm2 is approximately equal to "0".

(5) If a malfunction occurs in the terminal voltage detection circuits 37, 38 or the microcomputer 32, a value which is greatly different from Vb may be calculated as the sum Vm of the first and second terminal voltages Vm1, Vm2.

In this manner, if a malfunction as described in the aforementioned examples (1) through (5) occurs when the DC motor 10 is out of operation, the sum Vm of the first and second terminal voltages Vm1, Vm2 is approximately equal to "0" or 2·Vb. On the other hand, if there is no such malfunction, the sum Vm of the first and second terminal voltages Vm1, Vm2 is equal to Vb as described above. Therefore, it is also possible to judge the occurrence of a malfunction as described in the examples (1) through (3) in the same manner as in the case of detecting a malfunction during operation of the DC motor 10, i.e., through the processings in STEPS 106 and 112 through 120 shown in FIG. 3. Thus, there is no need to determine whether or not the motor current Im is equal to or greater than the predetermined current value Im0.

Thus, in this modification example, the microcomputer 32 omits the processings of STEPS 108, 110 and 122 through 130 shown in FIG. 3, and performs the processing of STEP 112 immediately after the processing of STEP 106. In other words, the microcomputer 32 may be designed to execute a program composed of STEPS 100 through 106, 112 through 120, and 132 through 138. Further, this modification example also dispenses with the motor current detection circuit 36. As a result, in addition to the effects of the aforementioned embodiment, this modification example makes it possible to detect a much wider variety of malfunctions through simple processings.

Figure 7:
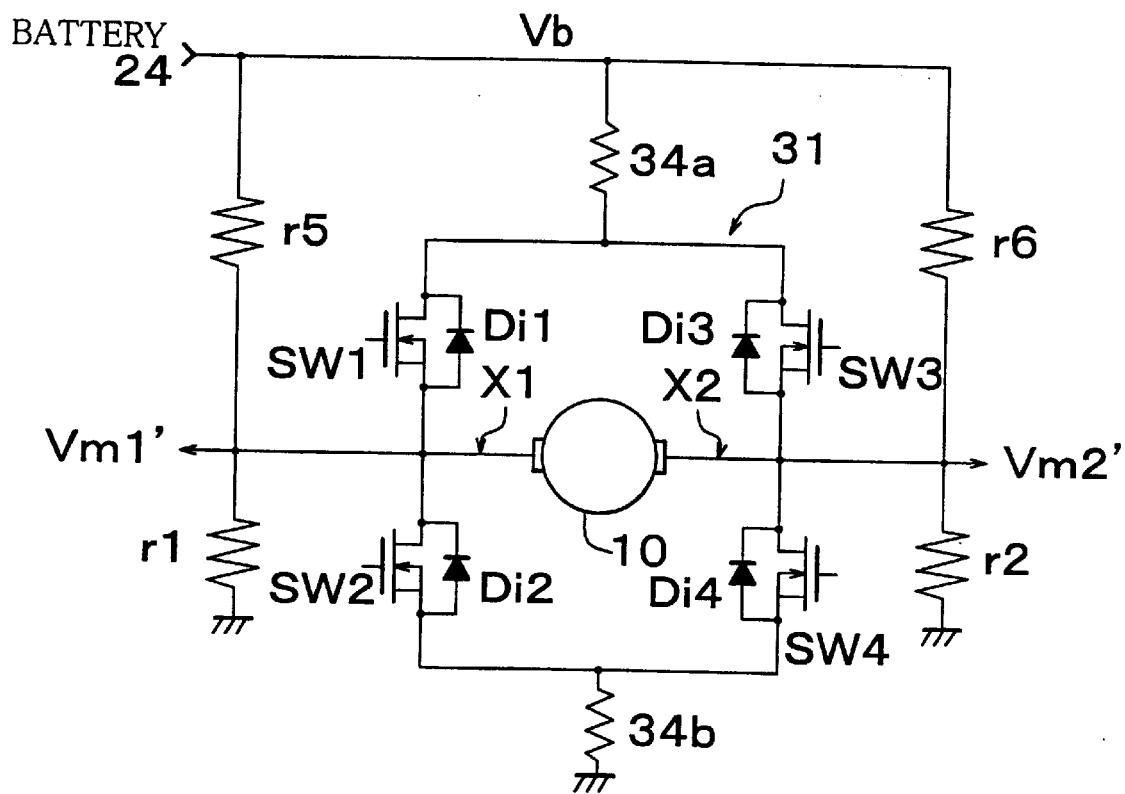
FIG. 7 is a diagram of a bridge circuit and its marginal circuit in accordance with another modification example of the embodiment.

Further, in addition to the construction of the circuit shown in FIG. 6, this modification example may be designed as shown in FIG. 7. That is, it is also possible to ground one end of the DC motor 10 through the pull-down resistor r1 as in the aforementioned embodiment or to connect the other end of the DC motor 10 to the power line of the battery 24 through the pull-up resistor r6. This also makes it possible to achieve substantially the same effects as those of the modification example by executing a program similar to that of the modification example.

Furthermore, it is also possible to dispense with the pull-down resistors r1, r2 shown in FIG. 7 and use only the pull-up resistors r5, r6. Also in this case, the switching elements SW1, SW4 or the switching elements SW2, SW3 of the bridge circuit 31 are controlled to be turned on and off. In the case where operation of the DC motor 10 is controlled, the operation is substantially the same as in the aforementioned embodiment. That is, the voltages Vm1', Vm2' at the ends of the motor 10 are alternately switched between a value which is approximately equal to "0" and a value which is approximately equal to Vb, and the sum Vm of the first and second terminal voltages Vm1, Vm2 is also approximately equal to Vb. Also, if a malfunction as described in the examples (1) through (9) of the aforementioned embodiment occurs during operation of the DC motor 10, the voltages Vm1', Vm2' at the ends of the motor 10 and the sum Vm of the first and second terminal voltages Vm1, Vm2 assume the values mentioned in the examples (1) through (9).

However, when the switching elements SW1, SW4 and the switching elements SW2, SW3 remain turned off and the DC motor 10 is out of operation, the voltages Vm1', Vm2' at the ends of the motor 10 are approximately equal to Vb, and the sum Vm of the first and second terminal voltages Vm1, Vm2 is approximately equal to 2·Vb. In this case, it is possible to detect a malfunction as described in the following examples (1) through (3).

(1) If the switching element SW2 or the switching element SW4 and the grounded line has been short-circuited, the voltages Vm1', Vm2' at the ends of the DC motor 10 are approximately equal to "0". Hence, the sum Vm of the first and second terminal voltages Vm1, Vm2 is approximately equal to "0".

(2) If one end X1 or the other end X2 of the DC motor 10 and the ground has been short-circuited (if the wiring harness at one end X1 or the other end X2 and the grounded line has been short-circuited), the voltages Vm1', Vm2' at the ends of the DC motor 10 are approximately equal to "0". Hence, the sum Vm of the first and second terminal voltages Vm1, Vm2 is approximately equal to "0".

(3) If a malfunction occurs in the terminal voltage detection circuits 37, 38 or the microcomputer 32, a value which is greatly different from 2·Vb may be calculated as the sum Vm of the first and second terminal voltages Vm1, Vm2.

Thus, this modification example may be designed to determine in STEP 124 of the program shown in FIG. 3 whether or not the sum Vm of the first and second terminal voltages Vm1, Vm2 has deviated from 2·Vb by a predetermined value or more. In other words, the processing of judgment in STEP 124 may be changed into the processing of determining whether or not the sum Vm is equal to or greater than a value obtained by adding the predetermined voltage value $\Delta$Vb to 2·Vb, i.e., 2·Vb+$\Delta$Vb and the processing of determining whether or not the sum Vm is equal to or smaller than a value obtained by subtracting the predetermined voltage value $\Delta$Vb from 2·Vb, i.e., 2·Vb–$\Delta$Vb, as in the aforementioned STEPS 112, 114. If the sum Vm satisfies the relation 2·Vb–$\Delta$Vb<Vm<2·Vb+$\Delta$Vb, it is determined that there is no malfunction occurring. Then, the program proceeds to STEP 126. If the sum Vm satisfies the relation Vm$\leq$2·Vb–$\Delta$Vb or 2·Vb+$\Delta$Vb$\leq$Vm, it is determined that there is a malfunction occurring. Then, the program proceeds to STEP 128. This also makes it possible to achieve substantially the same effects as in the aforementioned embodiment.

Further, in the aforementioned embodiment and modification examples, the motor current Im is detected by detecting voltages at both ends of the shunt resistor 34b. However, detection of the motor current Im may also be carried out such that voltages at both ends of the shunt resistor 34a are conducted into the motor current detection circuit 3. Furthermore, it is also possible to connect a resistor in series to the DC motor 10 between diagonal positions of the bridge circuit 31 to which the DC motor 10 is connected, and detect the motor current Im such that both ends of the resistor are conducted into the motor current detection circuit 36. Further, in the aforementioned embodiment and modification examples, the motor current Im is detected based on the voltage drop by the resistor. However, it is also possible to oppose a non-contact type current sensor such as a hall device to a contact position of the resistor, i.e., to a position where the motor current Im flows, and detect the motor current Im by means of the sensor.

Further, in the aforementioned embodiment and modification examples, the first and second terminal voltages Vm1, Vm2 of the DC motor 10 are inputted to the microcomputer 32, and the sum Vm of the terminal voltages is calculated through the processing of STEP 106 (FIG. 3) performed by the computer 32. However, instead of this, it is also possible to dispose an adder, which summates the first and second terminal voltages Vm1, Vm2 and outputs the sum Vm of both the terminal voltages Vm1, Vm2, between the terminal voltage detection circuits 37, 38 and the microcomputer 32, and input the sum Vm of the first and second terminal voltages Vm1, Vm2 to the microcomputer 32 simply from the adder in STEP 106.

As shown in FIG. 2, the invention is preferably implemented on a programmed general purpose computer 30. However, the entire invention, the malfunction judgment controller, operation judgment controller, continuation detection controller and/or failure processing controller can also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 3, can be used to implement the malfunction judgment controller, operation judgment controller, continuation detection controller and failure processing controller.

While the invention has been described with reference to a preferred embodiment thereof, it is to be understood that the invention is not limited to the disclosed embodiment or construction. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. A motor drive unit, comprising:
   a bridge circuit having four sides that each have a switching element;
   an electric motor having two ends connected to the bridge circuit;
   a motor drive device which operates the electric motor by connecting one of the switching elements to a power line and grounding an other one of the switching elements and which controls the electric motor by performing pulse width modulation control of the switching elements; and
   a malfunction judgment controller which judges the occurrence of a malfunction in at least one of the bridge circuit, the electric motor and the motor drive device when a sum of respective voltages at the two ends of the electric motor is different from a first predetermined value set based on a power voltage by a second predetermined value or more during operation of the electric motor.

2. The motor drive unit according to claim 1, further comprising:
   a current detection controller which detects a current flowing through the electric motor; and
   an operation judgment controller which judges, based on the detected current, whether the electric motor is in operation or out of operation.

3. The motor drive unit according to claim 1, further comprising:
   a continuation detection controller which detects whether or not the malfunction judgment device continuously judges the occurrence of a malfunction; and a failure processing controller which performs failure processing if the malfunction continues for a predetermined period.

4. The motor drive unit according to claim 3, wherein:
the failure processing includes at least one of stopping operating the electric motor, issuing a warning, and recording a type of the malfunction as a diagnosis code.

5. A motor drive unit, comprising:
a bridge circuit having four sides that each have a switching element;
an electric motor having two ends connected to the bridge circuit;
a motor drive device which operates the electric motor by connecting one of the switching elements to a power line and grounding an other one of the switching elements and which controls the electric motor by performing pulse width modulation control of the switching elements; and
a malfunction judgment controller which judges the occurrence of a malfunction in at least one of the bridge circuit, the electric motor and the motor drive device when the electric motor is out of operation by judging when a sum of respective voltages at the two ends of the electric motor is different from a first predetermined value set based on a power voltage by a second predetermined value or more, wherein the sum of respective voltage values are determined in advance based on the voltage values at the two ends of the electric motor during a turned-off state when operating normally.

6. The motor drive unit according to claim 5, further comprising:
a current detection controller which detects a current flowing through the electric motor; and
an operation judgment controller which judges, based on the detected current, whether the electric motor is in operation or out of operation.

7. The motor drive unit according to claim 5, further comprising:
a continuation detection controller which detects whether or not the malfunction judgment device continuously judges the occurrence of a malfunction; and
a failure processing controller which performs a failure processing if the malfunction continues for a predetermined period.

8. The motor drive unit according to claim 7, wherein:
the failure processing includes at least one of stopping operating the electric motor, issuing a warning, and recording a type of the malfunction as a diagnosis code.

9. A motor drive unit, comprising:
a bridge circuit having four sides that each have a switching element;
an electric motor having two ends connected to the bridging circuit;
a motor drive device which operates the electric motor by connecting one of switching elements to a power line and grounding an other one of the switching elements and which controls the electric motor by performing pulse width modulation control of the switching elements; and
a circuit which sets terminal voltages at the two ends of the electric motor to a lower power voltage during a turned-off state of all the switching elements, wherein the circuit comprises:
a pull-up resistor connected to at least one of the two ends of the electric motor and to the power line; and
a pull-down resistor connected to at least the other of the two ends of the electric motor and to the ground; and
a malfunction judgment controller which judges the occurrence of a malfunction in at least one of the bridge circuit, the electric motor and the motor drive device when a sum of the respective voltages at the ends of the electric motor is different from a first predetermined value s et based on a power voltage by a second predetermined value or more during operation of the electric motor.

10. The motor drive unit according to claim 9, further comprising:
a continuation detection controller which detects whether or not the malfunction judgment device continuously judges the occurrence of a malfunction; and
a failure processing controller which performs a failure processing if the judgment of the occurrence of the malfunction continues for a predetermined period.

11. The motor drive unit according to claim 10, wherein:
the failure processing includes at least one of stopping operating the electric motor, issuing a warning, and recording a detected state of the malfunction as a diagnosis code.

12. A method of detecting a malfunction for a motor drive unit having a bridge circuit having four sides that each have a switching element, an electric motor having at ends connected to the bridge circuit, a power circuit which operates the electric motor by connecting one of the switching elements to a power line and grounding an other one of the switching elements, and a motor drive device which controls the electric motor by performing pulse width modulation control of the switching elements, comprising the steps of:
detecting a sum of the voltages at the switching elements of the electric motor; and
judging the occurrence of a malfunction in at least one of the bridge circuit, the electric motor and the motor drive device if the sum of respective voltages at the two ends of the electric motor is different from a first predetermined value set based on a power voltage by a second predetermined value or more during operation of the electric motor.

13. A method of detecting a malfunction for a motor drive unit having a bridge circuit having four sides that each have a switching element, an electric motor having two ends connected to the bridge circuit, a power circuit which operates the electric motor by connecting one of the switching elements to a power line and grounding an other one of the switching elements, and a motor drive device which controls the electric motor by performing pulse width modulation control of the switching elements, comprising the steps of:
detecting a sum of the voltages at the two ends of the electric motor; and
judging the occurrence of a malfunction in at least one of the bridge circuit, the electric motor and the motor drive device, when the electric motor is out of operation, if the detected sum of respective voltages is different from a first predetermined value set based on a power voltage at the power line by a second predetermined value or more, wherein the sum of voltage values are determined in advance based on the voltage values at the two ends of the electric motor during a turned-off state.

14. A method of detecting a malfunction for a motor drive unit having a bridge circuit having four sides that each have a switching element, an electric motor having two ends connected to the bridge circuit, a power circuit which operates the electric motor by connecting one of the switching elements to a power line and grounding an other one of the switching elements, and a motor drive device which controls the electric motor by performing pulse width modulation control of the switching elements, comprising the steps of:

setting terminal voltages at the two ends of the electric motor to a lower power voltage during a turned-off state of all the switching elements by connecting at least one of the two ends of the electric motor to the power line through a pull-up resistor and grounding at least one of the other of the two ends of the electric motor through a pull-down resistor;

detecting a sum of the voltages at the switching elements of the electric motor; and judging the occurrence of a malfunction in at least one of the bridge circuit, the electric motor and the motor drive device if a sum of the respective terminal voltages of the electric motor is different from a first predetermined value set based on a power voltage by a second predetermined value or more.

* * * * *